US006496979B1

(12) United States Patent
Chen et al.

(10) Patent No.: US 6,496,979 B1
(45) Date of Patent: *Dec. 17, 2002

(54) SYSTEM AND METHOD FOR MANAGING APPLICATION INSTALLATION FOR A MOBILE DEVICE

(75) Inventors: James Chen, Redmond, WA (US); Kevin Shields, Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,031

(22) Filed: Apr. 10, 1998

Related U.S. Application Data

(60) Provisional application No. 60/063,164, filed on Oct. 24, 1997, and provisional application No. 60/064,986, filed on Nov. 7, 1997.

(51) Int. Cl.[7] .............................................. G06F 9/445
(52) U.S. Cl. ..................................................... 717/178
(58) Field of Search ................... 395/712; 709/200–203, 709/221; 717/11, 168–178; 455/418–419; 370/486

(56) References Cited

U.S. PATENT DOCUMENTS

| | | | |
|---|---|---|---|
| 5,247,683 A | * 9/1993 | Holmes et al. ............. 709/221 |
| 5,337,044 A | 8/1994 | Folger et al. ................ 340/7.1 |
| 5,392,390 A | 2/1995 | Crozier ........................ 345/335 |
| 5,414,844 A | 5/1995 | Wang .......................... 713/200 |
| 5,497,464 A | 3/1996 | Yeh ............................. 710/101 |
| 5,522,089 A | 5/1996 | Kikinis et al. ................ 710/73 |
| 5,542,046 A | 7/1996 | Carlson et al. ............. 713/200 |
| 5,555,416 A | * 9/1996 | Owens et al. ............... 717/178 |
| 5,564,070 A | 10/1996 | Want et al. .................. 455/507 |
| 5,598,536 A | 1/1997 | Slaughter, III et al. ..... 709/219 |
| 5,625,829 A | 4/1997 | Gephardt et al. ........... 710/104 |
| 5,664,228 A | 9/1997 | Mital .......................... 710/62 |
| 5,666,530 A | 9/1997 | Clark et al. ................. 707/201 |

(List continued on next page.)

FOREIGN PATENT DOCUMENTS

| WO | WO 94 15294 A | 7/1994 | |
| WO | WO94/15294 | * 7/1994 | .......... G06F/13/00 |
| WO | WO 96 20445 A | 7/1996 | |
| WO | WO 97 23853 A | 7/1997 | .......... G08C/25/02 |
| WO | WO 97 25665 A | 7/1997 | ............ G06F/3/00 |

OTHER PUBLICATIONS

Pepper, D.J. et al., "The CallManager system: A platform for intelligent telecommunications services", Speech Communication, Oct. 1997, Elsevier, Netherlands, vol. 23, No. 102, pp. 129–139.

Anonymous, "Method for Personal Digital Assistance Calendar Export Nomenclature", IBM Technical Disclosure Bulletin, vol. 37, No. 3, Mar. 1994, p. 481.

*Primary Examiner*—Kakali Chaki
*Assistant Examiner*—Hoang-Vu Antony Nguyen-Ba
(74) *Attorney, Agent, or Firm*—Westman, Champlin & Kelly, P.A.; S. Koehler

(57) ABSTRACT

A method and system of installing applications for a plurality of mobile devices from a storage source, wherein each mobile device is of a different type, includes storing on the storage source a plurality of applications. Each application is designed for a unique type of mobile device. The mobile device is connected to the storage source and the type of mobile device is detected. A selected application is then transferred to the mobile device.

23 Claims, 10 Drawing Sheets

U.S. PATENT DOCUMENTS

| | | | |
|---|---|---|---|
| 5,666,553 A | | 9/1997 | Crozier ........................ 707/540 |
| 5,684,990 A | | 11/1997 | Boothby ...................... 707/203 |
| 5,717,737 A | | 2/1998 | Doviak et al. ............... 455/403 |
| 5,721,824 A | * | 2/1998 | Taylor ......................... 709/203 |
| 5,721,835 A | | 2/1998 | Niwa et al. .................. 710/101 |
| 5,727,159 A | | 3/1998 | Kikinis ........................ 709/246 |
| 5,727,202 A | | 3/1998 | Kucala ......................... 707/10 |
| 5,742,829 A | * | 4/1998 | Davis et al. ................. 717/178 |
| 5,790,800 A | | 8/1998 | Gauvin et al. ............... 709/227 |
| 5,812,819 A | | 9/1998 | Rodwin et al. ............... 703/23 |
| 5,845,090 A | * | 12/1998 | Collins, III et al. ......... 709/221 |
| 5,860,012 A | * | 1/1999 | Luu ............................. 717/175 |
| 5,864,708 A | | 1/1999 | Croft et al. ..................... 710/1 |
| 5,887,063 A | | 3/1999 | Vardharajan et al. ........ 713/172 |
| 5,896,369 A | | 4/1999 | Warsta et al. ................ 370/338 |
| 5,918,016 A | | 6/1999 | Brewer et al. ............... 709/220 |
| 5,958,006 A | | 9/1999 | Eggleston et al. ........... 709/219 |
| 5,974,238 A | | 10/1999 | Chase, Jr. .................... 709/248 |
| 5,974,257 A | * | 10/1999 | Austin ......................... 717/125 |
| 5,983,176 A | | 11/1999 | Hoffert et al. ............... 704/233 |

\* cited by examiner

SYSTEM AND METHOD FOR MANAGING APPLICATION INSTALLATION FOR A MOBILE DEVICE

REFERENCE TO CO-PENDING PATENT APPLICATIONS

The present application claims priority from and fully incorporates herein, U.S. Provisional patent application Ser. No. 60/063,164, filed on Oct. 24, 1997, and U.S. Provisional patent application Ser. No. 60/064,986, filed on Nov. 7, 1997.

BACKGROUND OF THE INVENTION

The present invention relates to personal mobile computing devices commonly known as handheld portable computers. More particularly, the present invention relates to a system and method for creating an application setup package for installing application programs onto such devices, and managing installed application device programs from the desktop computer.

Mobile devices are small electronic computing devices often referred to as personal digital assistants. Two such mobile devices are sold under the trade name Handheld PC (or "H/PC") and also Palm PC (or "P/PC") by Microsoft Corporation of Redmond, Wash. Although small, a wide variety of computing tasks and applications can be performed by such mobile devices, such as word processing, spread sheet programs, personal money managers and games, to name a few. In many respects, these programs are very similar to programs that reside on an individual's desktop computer. In some applications, the mobile device may not have as many functions as that available on the desktop computer, but nevertheless, are quite valuable as a means for updating and changing data in the field where even a laptop computer may not be available or used conveniently.

As stated above, a mobile device can be used in conjunction with a desktop computer. For example, the user of a mobile device may also have access to, and use, a desktop computer at work or at home. A user may typically run the same types of applications on both the desktop computer and the mobile device. Thus, it is quite advantageous for the mobile device to be designed to be coupled to the desktop computer to exchange information with, and share information with, the mobile device. However, in view that the mobile device has limited storage capabilities, a user may not be able to install all applications he may have for the mobile device at the same time. In such instances, the user must remove those applications which are not necessary in order to make room for other desired applications.

A number of significant problems exist when applications are deleted from or transferred to a mobile device from a desktop computer. Commonly, an application may include a number of files which must be correctly installed onto the mobile device in preselected directories, and settings must be made to the mobile device in order to properly configure the device for such applications. In some platforms, such as those sold by Microsoft Corporation of Redmond, Wash., a "Registry" is maintained. The Registry is a well-known database that is a source of information about applications present on the computing device. This information is used by applications that require persistent data storage (such as user settings). One method for installing a new application on the mobile computing device includes connecting the mobile computing device to a desktop computer having a stored copy of the desired application. The user then transfers each file of the application onto the computing device, storing it as required in preselected directories so as to be accessed by the application. Registry values are then changed in accordance with the requirements of the application. In some systems, the desktop computer executes a script file which contains a listing of each file needed for the application and transfers the file sequentially down to the mobile device.

One significant problem associated with the latter method occurs if the connection between the desktop computer and the mobile device is disrupted during the downloading procedure. For example, from inadvertent or accidental error, the connection may be broken only after some of the files required by the application have been transferred. In this event, the mobile computing device contains only some of the necessary files for the application and the downloading procedure must be repeated. If more than one application is being transferred down to the mobile device, this may require the entire procedure to be repeated.

Another significant problem involves the script file itself and, in particular, error handling. When installing an application from the desktop computer to the mobile device using a simple script file, the installation program must perform "run-time" error handling such as with missing files, and errors in the script file. These problems would be encountered by the end-user. Ideally, these problems should be resolved at "compile-time", before the application setup program is in its final product state. End-users should not need to encounter problems like these when installing an application to their mobile device.

Another significant drawback of the current method of installing applications onto a mobile device is the requirement of the mobile device to be connected to the desktop computer in order to transfer the desired application. This requires the user to first install an application for the mobile device onto the desktop computer, and then, after a connection has been made, transfer the application from the desktop computer to the mobile device.

There is a continuing need to overcome the shortcomings of the present methods for installing applications onto a mobile computing device. In particular, there is a need to reduce the number of operations necessary to be performed by the user in order to install an application. In addition, the actual application installation procedure should not need to handle errors that can be resolved before the final product is shipped. The user should also have the ability to install an application from sources other than the dedicated desktop computer.

In addition, many times the application must be uniquely written to run on a specific mobile device. Thus, there may be many variations of the same application, each being designed for a different type of CPU. There is a need to easily create the variations of the application as well as easily ascertain and access the correct variation if all are stored on the same desktop computer for use by multiple mobile device users having different CPU platforms.

SUMMARY OF THE INVENTION

A system and method of installing applications for a plurality of mobile devices from a storage source, wherein each mobile device is of a different type, includes storing on the storage source a plurality of applications. Each application is designed for a unique type of mobile device. The mobile device is connected to the storage source and the type of mobile device is detected. A selected application is then transferred to the mobile device.

A system and method of installing program applications from a storage source onto a mobile device includes in one aspect, storing the necessary application files and registry information in a single setup package. The setup package comprises a single file having a first portion comprising application setup instructions and a second portion comprising application files. The application setup instructions include setup information such as settings to be made on the mobile device and where the application files are to be stored on the mobile device. Upon selection by a user, the setup package file is transferred and stored on the mobile device. The setup package file is then unpacked, installing the executable application program on the mobile device and, preferably, the setup package file is subsequently automatically deleted.

In another broad aspect of the present invention, a system and method of installing a program application from a storage source onto a mobile device includes storing on the storage source a plurality of setup package files, with each setup package file corresponding to one or more types of mobile devices. Upon connection of a mobile device to the storage source, the system detects the type of mobile device from a plurality of known mobile devices. The system then selects the setup package file applicable to the detected mobile device.

In another broad aspect of the present invention, a method of installing a program application on a mobile device includes storing information on the mobile device indicative of the application to be installed, and deleting the information on the mobile device as the application is being installed on the mobile device.

In yet another broad aspect of the present invention, a computer-readable medium having stored thereon data structure for installing a program application from a storage source onto a mobile device is disclosed. The data structure includes a first portion comprising application specific information and a second portion comprising application files. The application specification information includes setup information such as settings to be made on the mobile device and where the application files are to be stored on the mobile device.

DETAILED DESCRIPTION OF THE PREFERRED EMBODIMENTS

Figure 1:
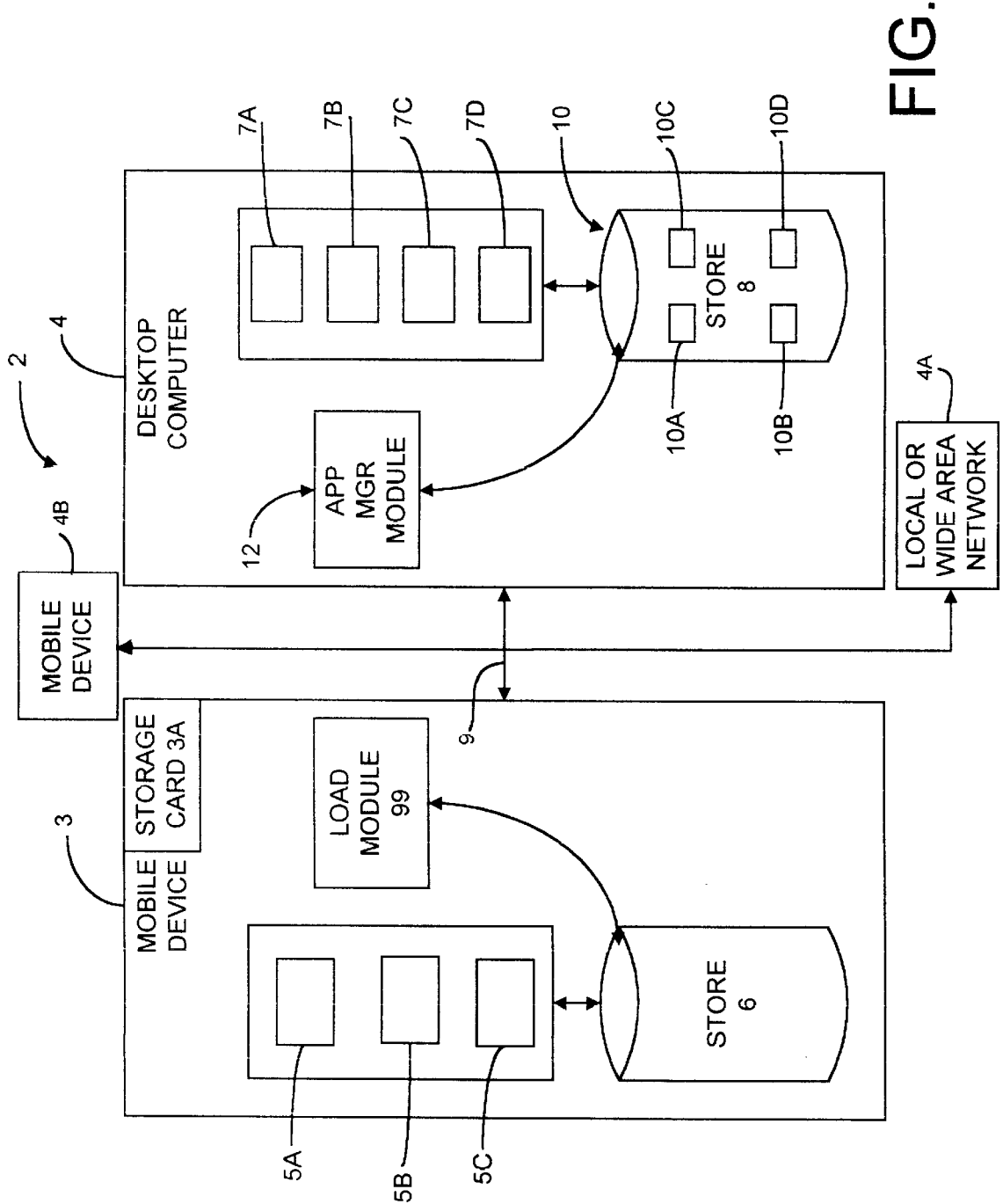
FIG. 1 is a block diagram illustrating one environment in which the present invention operates.

FIG. 1 is a block diagram of one environment 2 in which the present invention operates. Environment 2 includes a mobile device 3 and a desktop computer 4. The mobile device 3 includes one or more application programs indicated at 5A, 5B and 5C, and a store 6. The desktop computer 4 also includes one or more application programs indicated at 7A, 7B, 7C and 7D, and a store 8. The mobile device 3 and the desktop computer 4 are connectable by one of a plurality of known connection mechanisms 9, such as a serial connection, an infrared link or a modem connection via the Internet or a direct dial. The form of the connection mechanism 9 is irrelevant, but additional forms of connections are described in copending application entitled "INTEGRATED COMMUNICATIONS ARCHITECTURE ON A MOBILE DEVICE" filed on even herewith, which is incorporated herein by reference.

In one embodiment of the present invention, application programs 7A–7D are applications for a word processing program, a personal money manager, a spread sheet program, or a game program, to name just a few. The store 8 is a memory which is configured to store a plurality of individual files for running the program or for maintaining data such as records or objects entered by the user. The desktop computer 4 executes the application programs 7A–7D and uses the files and objects stored in store 8 as necessary.

The application programs 5A–5C are designed to access data stored in the store 6 in a manner similar to the applications programs 7A–7D residing on the desktop computer 4. In some embodiments, the application programs 5A–5C have been optimized or reduced in some manner to run on the mobile device 3 in view of typically limited memory available on the store 6. For instance, the application program 7A on the desktop computer 4 may be a word processor such as Word brand word processor sold by Microsoft Corporation, while the application program 5A on the mobile device 3 may be Pocket Word brand word processor sold by Microsoft Corporation. However, since the mobile device 3 has limited memory making up the store 6, the user may not be able to install all programs corresponding to application programs 7A–7D, or other desired programs onto the mobile device 3 at any one time. In the embodiment illustrated, this is illustrated wherein three application programs 5A–5C reside on the mobile device 3, while four application programs 7A–7D reside on the desktop computer 4. Thus, it may be necessary for the user to occasionally remove one or all of the application programs 5A–5C installed on the mobile device 3 in order to install and run the desired applications. In the embodiment illustrated, all necessary information for installing the application programs 5A–5C onto the mobile device 3 are stored in the store 8 in one of a plurality of unique setup package files indicated at 10. Specifically, setup package file 10A contains or includes all of the program files and the user settings for installing the application program 5A onto the mobile device 3. Similarly, setup package file 10B includes all of the program files and usersettings for installing the application program 5B onto the mobile device 3, while setup package file 10C includes all of the files and user settings for installing the application program 5C onto the mobile device 3. As stated above, application programs 5A–5C are similar but not necessarily identical to application programs 7A–7C on the desktop computer 4. A setup package file 10C for mobile device 3 indicated in the store 8 contains all of the files and user settings for installing and running the program 5C on the mobile device 3.

In view that the setup package files 10A–10D are each a single file containing all files and settings necessary for installing the corresponding application programs onto the mobile device 3, the setup package files are not limited to use solely on a desktop computer 4. For instance, referring to FIG. 1, the mobile device 3 can be connected through the communication link 9 to a Local or a wide area network 4A, for example, the Internet. Although the actual creation of the setup package file would be done by an independent software vendor (ISV), requiring a suitable desktop computer, once the setup package file has been stored on a server (not shown), the mobile device 3 can access the stored setup package file on the local or wide area network 4A using a suitable browser.

In yet another operating environment, the mobile device 3 can be connected to a second mobile device 4B through the suitable communication link 9. In this manner, application programs can be transferred between the mobile devices 3 and 4B.

In addition, the setup package files 10A–10D can be transferred to the mobile device 3 using a removable storage or memory card 3A, which are commonly present in mobile devices.

Generally, one broad aspect of the present invention includes the creation of the setup package files 10A–10D for installing the corresponding programs onto the mobile device 3. Another broad aspect includes the unique structure of the setup package files 10A–10D. Yet, another broad aspect of the present invention includes an application manager module 12 provided on the desktop computer 4 to manage the uninstalling and installing of the setup package files 10A–10D onto the mobile device 3 as requested by the user.

Before describing aspects of the present invention, a brief description of the desktop computer 4 and the mobile device 3 will be helpful.

Figure 2:
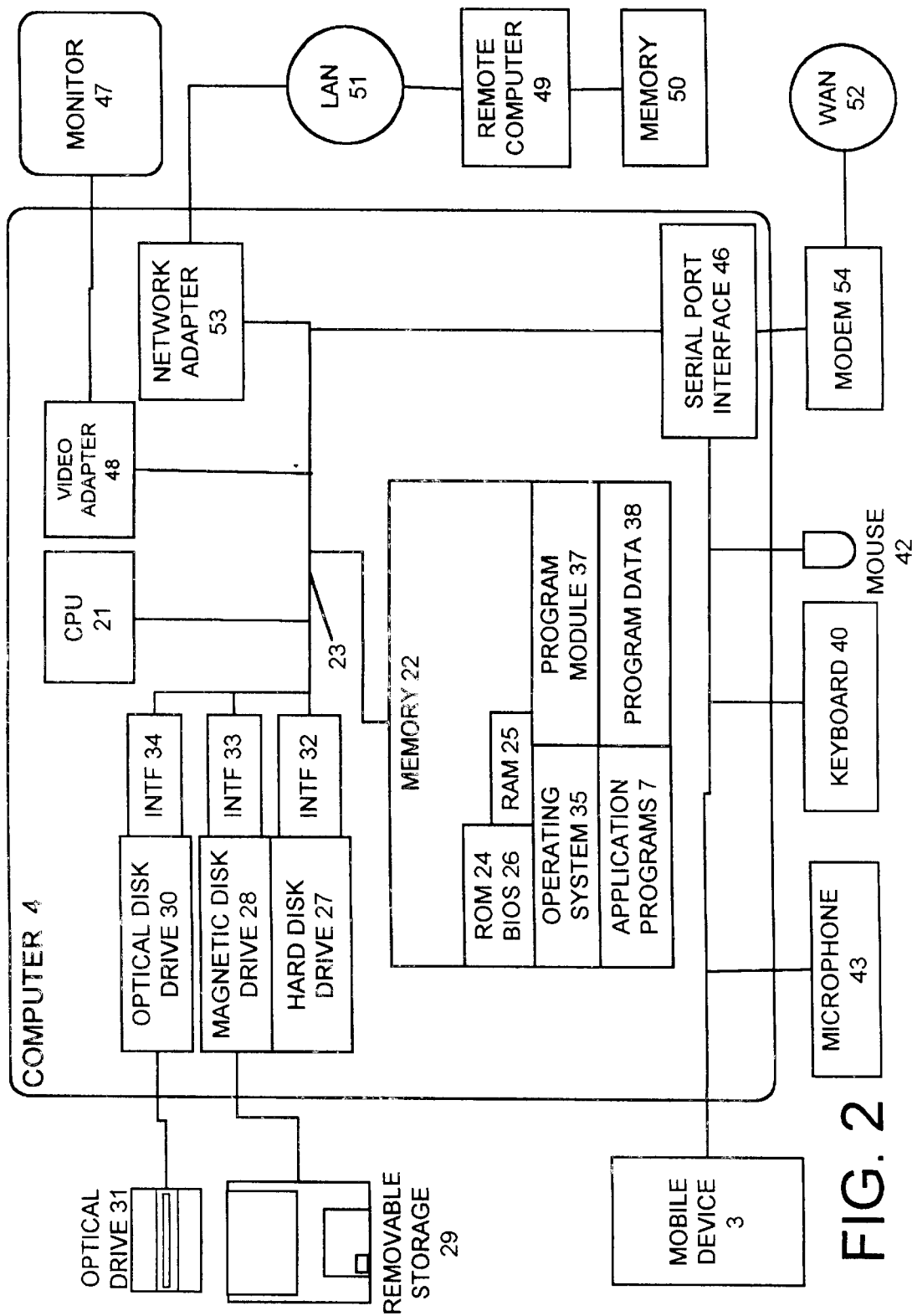
FIG. 2 is a block diagram of one embodiment of a conventional desktop computer used in conjunction with a mobile device.
Figure 3:
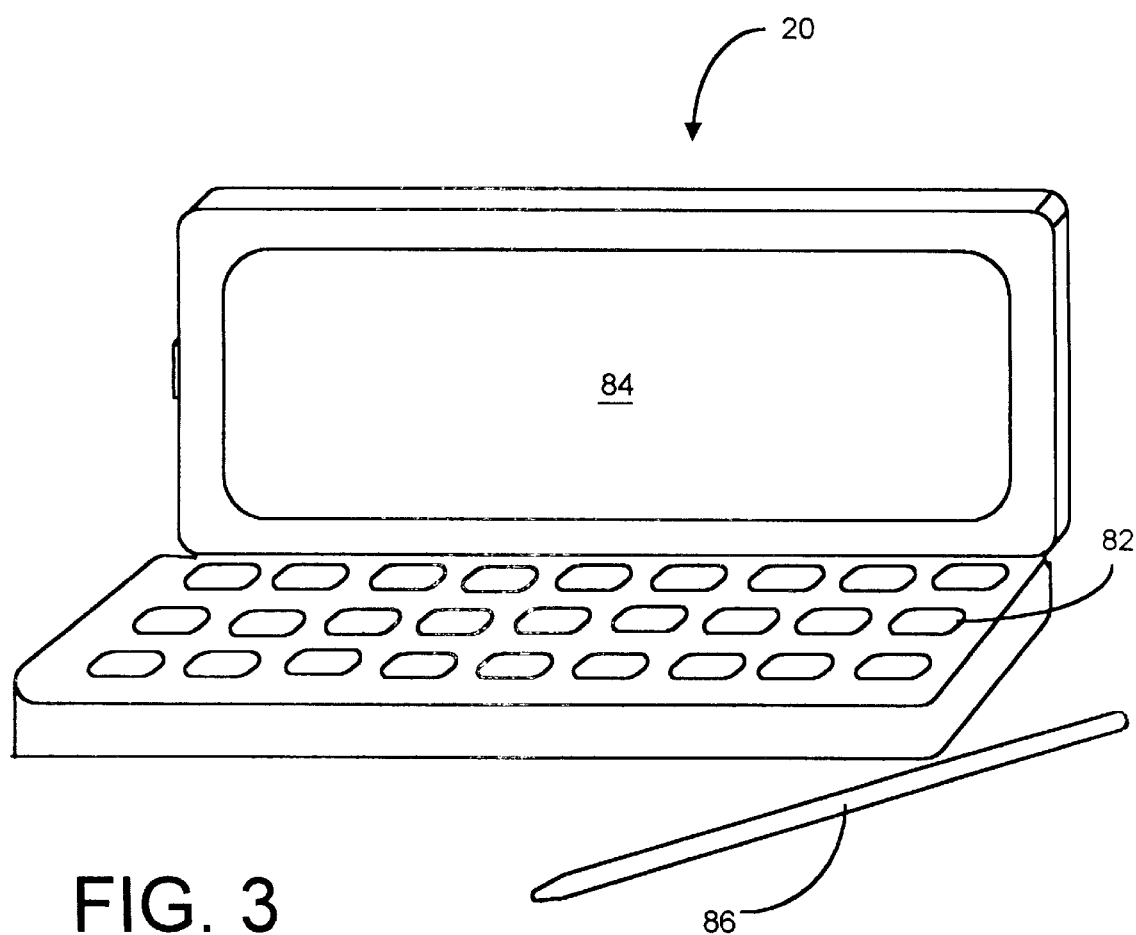
FIG. 3 is a simplified pictorial illustrating one embodiment of a mobile device in accordance with the present invention.
Figure 4:
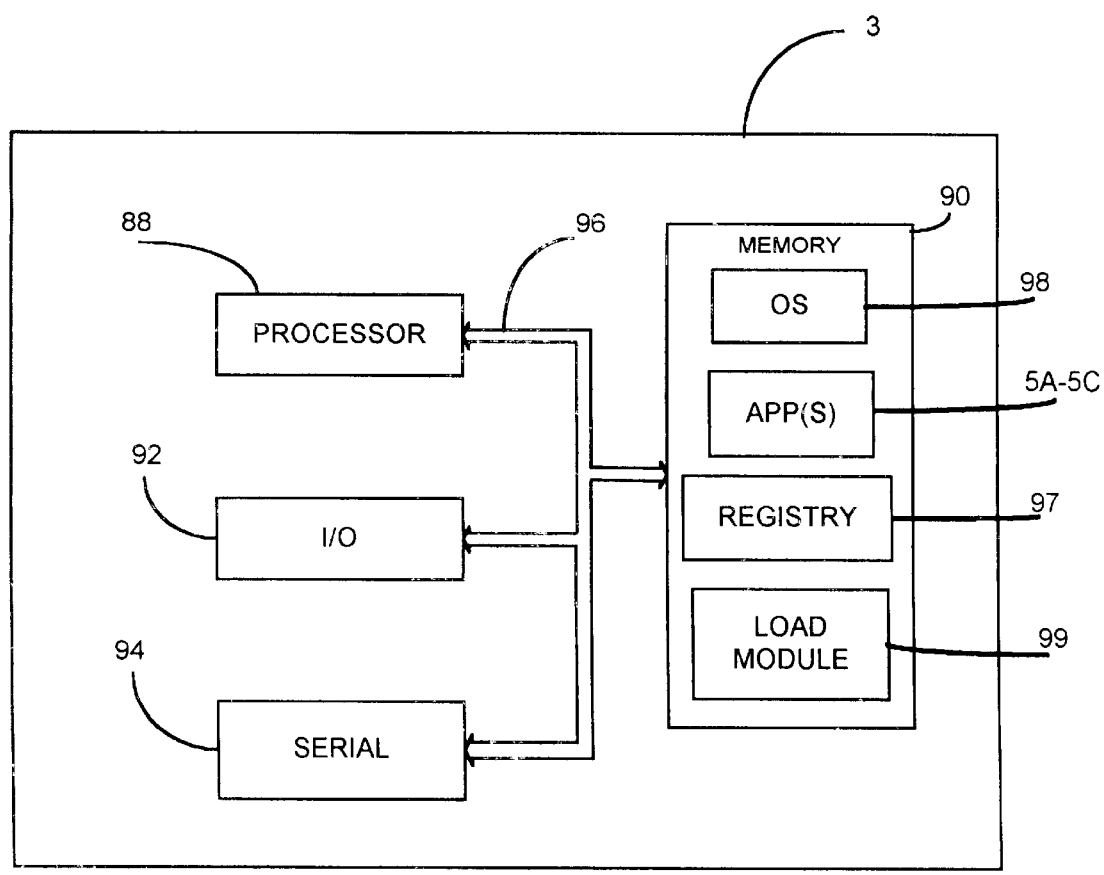
FIG. 4 is one embodiment of a simplified block diagram of the mobile device shown in FIG. 3.

FIGS. 2, 3 and 4 and the related discussion are intended to provide a brief, general description of a suitable computing environment in which the invention may be implemented. Although not required, the invention will be described, at least in part, in the general context of computer-executable instructions, such as program modules, being executed by the desktop computer 4 or the mobile device 3. Generally, program modules include routine programs, objects, components, data structures, etc. that perform particular tasks or implement particular abstract data types. Moreover, those skilled in the art will appreciate that the invention may be practiced with other computer system configurations, including other handheld devices, such as palmtop computers, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal or desktop computer 4, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the desktop computer 4, such as during start-up, is stored in ROM 24. The desktop computer 4 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the desktop computer 4.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more of the application programs 7A–7D, other program modules 37, and program data 38. A user may enter commands and information into the desktop computer 4 through input devices such as a keyboard 40, a pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker and printers (not shown).

The desktop computer 4 may operate in a networked environment using logic connections to one or more remote computers, such as a remote computer 49. The remote computer 49 may be another personal computer, a server, a router, a network PC, a peer device or other network node, and typically includes many or all of the elements described above relative to the desktop computer 4, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to the desktop computer 4, or portions thereof, may be stored in the remote memory storage devices, not shown. It will be appreciated that the network connections shown are exemplary and other means of establishing a communications link between the computers may be used. In the embodiment illustrated, the mobile device 3 also connects to the desktop computer 4 through the serial port 46.

The desktop computer 4 runs an operating system that is stored in any of the memory storage devices illustrated in FIG. 2 and executes on the processing unit 21. One suitable operating system is a Windows brand operating system sold by Microsoft Corporation, such as Windows 95 or Windows NT, or other derivative versions of Windows brand operating systems, or another suitable operating system. Other suitable operating systems include systems such as Macintosh OS sold from Apple Corporation, and the OS/2 Presentation Manager sold by International Business Machines (IBM).

FIG. 3 is a pictorial illustration of one preferred embodiment of a mobile device 3 which can be used in accordance with the present invention. The mobile device 3, in one embodiment, is a desktop assistant sold under the designation H/PC by Microsoft Corporation. The mobile device 3 has some components which are similar to those of the desktop computer 4. For instance, in one embodiment, the mobile device 3 includes a miniaturized keyboard 82, a display 84 and a stylus 86. The display 84 can be a LCD display which uses a contact-sensitive display screen 84 in conjunction with the stylus 86. The stylus 86 is used to press or contact the display 84 at designated coordinates to accomplish certain user input functions. Of course, other configurations could be used as well. For example, user input mechanisms could be included such as a keypad, a track ball, and various types of miniaturized keyboards, or the like. In addition, the mobile device 3 may not be embodied as the Microsoft H/PC brand of desktop assistant, but could also be implemented as another type of personal digital assistant PDA, another personal organizer, a palmtop computer, or a similar computerized notepad device.

FIG. 4 is a more detailed block diagram of the mobile device 3. The mobile device 3 preferably includes a microprocessor 88, memory 90, input/output (I/O) components 92 (which includes the keyboard 82 and the touch sensitive display screen 84 and a serial interface 94. In one embodiment, these components are coupled for communication with one another over a suitable bus 96. The memory 90 can be implemented as non-volatile electronic memory such as a random access memory (RAM) with a battery back-up module (not shown) such that information stored in the memory 90 is not lost when the general power to mobile device 3 is shut down. A portion of memory 90 is preferably allocated as an addressable memory for program execution, while the remaining portion of memory 90 is preferably used to simulate storage on a disk drive where memory 90, of course, functions as the store 6 in FIG. 1.

Memory 90 includes an operating system 98 and the application programs 5A–5C. The operating system 98, during operation, is preferably executed by the microprocessor 88. The operating system 98, in one embodiment, is the Windows CE brand operating system commercially available from Microsoft Corporation. The operating system 98 is preferably designed for mobile devices and implements database features which can be utilized by the application programs 5A–5C through a set of exposed application programming interfaces (API) and methods. The objects in the store 6 are preferably maintained by the application programs 5A–5C and the operating system 98, at least partially in response to calls to the exposed application program interfaces and methods. As noted above, the application programs 5A–5C are not necessarily designed to be entirely compatible with corresponding application programs 7A–7C which execute on the desktop computer 4. For instance, there may not be the precise one-to-one matching between the properties of specific object types. Some properties which are supported by the features of the application programs 5A–5C may have no corresponding features in the application programs 7A–7C on the desktop computer 4, or vice versa.

In addition to the application programs 5A–5C and the operating system 98, memory 90 further stores a registry 97 used in operating systems such as Windows CE brand operating systems. The registry 97 is a well-known database that is a source of information about the application programs 5A–5C present on the mobile device 3. This information is used by applications that require persistent data storage (such as user settings). Memory 90 further stores an installer module 99 (shown in FIG. 1), which is explained below, to "unpack" the setup package files, for example, file 10A stored on the desktop computer 4 after it has been transferred to the mobile device 3.

Figure 5:
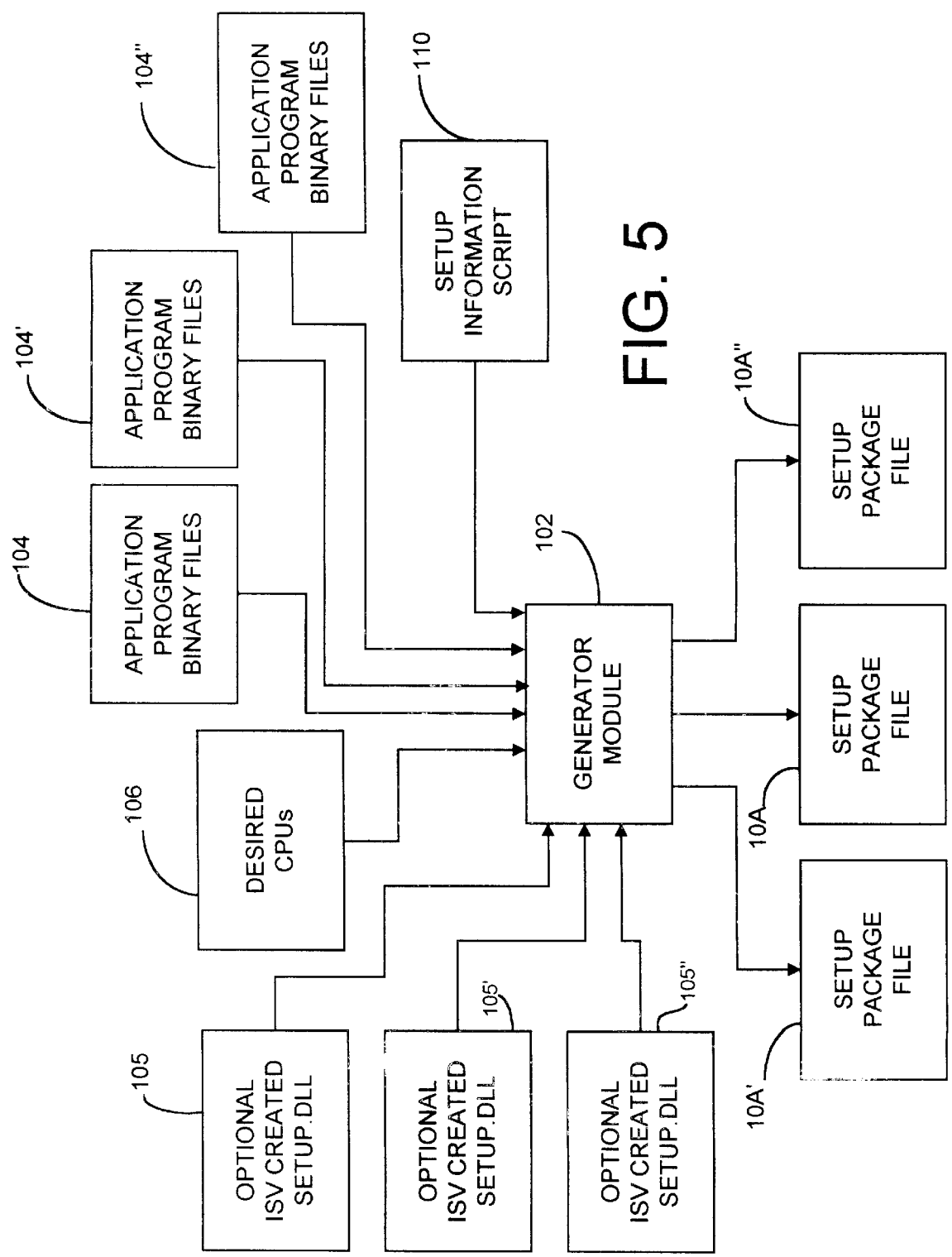
FIG. 5 is a pictorial illustrating creation of an application for use on the mobile device.

FIG. 5 is a pictorial illustrating generation of a setup package file 10A and preferably similar setup package files 10A' and 10A". Generally, the setup package file 10A is created using a generator module 102 which operates on a suitable desktop computer such as the desktop computer 4 illustrated in FIG. 2. The ISV uses the generator module 102 to convert application program binary files 104, 104' and 104" (each set of binaries can include specific code for the target mobile device, as well as non-specific files) into setup package files 10A, 10A' and 10A", which are specific to the target mobile device, packaged together as a single file for transfer to the mobile device 3. For instance, the setup package files 10A, 10A' and 10A" can be created for mobile devices having different types of hardware, such as different input devices or different CPUs. In other words, setup package files 10A, 10A' and 10A" can all be for the same type of CPU, but distinguishable based on other criteria or characteristics of the mobile devices.

In one embodiment, the setup package files 10A, 10A' and 10A" are a modified form of a "cabinet file". Cabinet files are an efficient method of distribution that has been used by Microsoft Corporation in its products in the past. A cabinet file can be created with compression, or with no compression. The main advantage for using compression when creating a cabinet file is so that the file is smaller to download, saving communication time, which can be an important factor. However, this means that the installer module 99 on the mobile device 3 will need to implement decompression code, which would increase the file and execution size of the installer module 99. Since the mobile device 3 typically has limited memory capabilities, increasing the size of the installer module 99, which resides on the mobile device 3, may not be desired. In addition, since the setup package files 10A–10D include all of the files necessary to run the corresponding applications 5A–5D, complete transfer of the setup package files 10A–10D to the mobile device 3 in an uncompressed format assures that the mobile device 3 has enough available memory for the applications 5A–5D once the setup package file is "unpacked". Furthermore, the operating system 98 uses or operates with files that have already been compressed, so there may be minimal storage savings for having a compressed setup package file. In other words, there are usually minimal savings for compressing a compressed file. However, if it is desired that the mobile device 3 carry a setup package file for later transfer to another mobile device or other computer, then it can be compressed during storage on the mobile device 3 to make the setup package file smaller.

In addition to the application program binary files 104, 104' and 104", the generator module 102 receives information indicative of the desired CPU dependent setup package files to be created. Since there are many different types of personal assistants, personal organizers and the like, many of which run on different types of CPUs, it is necessary to have multiple setup package files 10A, 10A' and 10A", each supporting a specific CPU type. A list of supported CPU information is provided at 106.

In the embodiment illustrated, the generator module 102 also receives other application specific information that is used to run the application program on the mobile device 3. The application specific information is contained in a setup information script file 110 and includes information such as the application display name, the application registry data to create, the directories to create, the files to copy, the default installation directory, shortcut information, and other typical setup information. The information is provided by the ISV in a suitable script file such as an "INF" file commonly used in Windows brand operating systems, In one embodiment, the generator module 102 analyzes the setup information script 110 and verifies the syntax and structure, verifying, for example, the presence of all necessary files before forming the setup package file. The procedure is analogous to a "source" file (setup information script 110) which is then "compiled" to create a "compiled" setup information file 120A which would be included in the final setup package file. In this manner, only final macro substitution and error handling would need to be performed during application installation. Syntax and structure checking of the setup information script 110 by the generator module 102 thus minimizes errors before final distribution of the application by the ISV as setup package files 10A, 10A' and 10A", which would otherwise only be found upon installation of the application on the mobile device 3, or possibly at runtime. In one embodiment, the setup information script 110 format is similar to the format used in 32 bit Windows brand operating system information files, which are well-known to those skilled in the art. Appendix A provides a listing of various sections for the Windows brand operating system setup information script 110. The format for one embodiment of a "compiled" setup information file is provided in Appendix B.

As stated above, the generator module 102 typically generates setup package files 10A, 10A' and 10A" that are dependent upon the CPU of the mobile device 3. It should be noted that the program generator 102 can also generate a setup package file that is independent of the device type, for example, a setup package file containing only text files, which are inherently non-device-specific, by providing this information in the setup information script 110, and the non-existence of the list of supported CPUs 106. The result is a single setup package file that is device independent.

Figure 6:
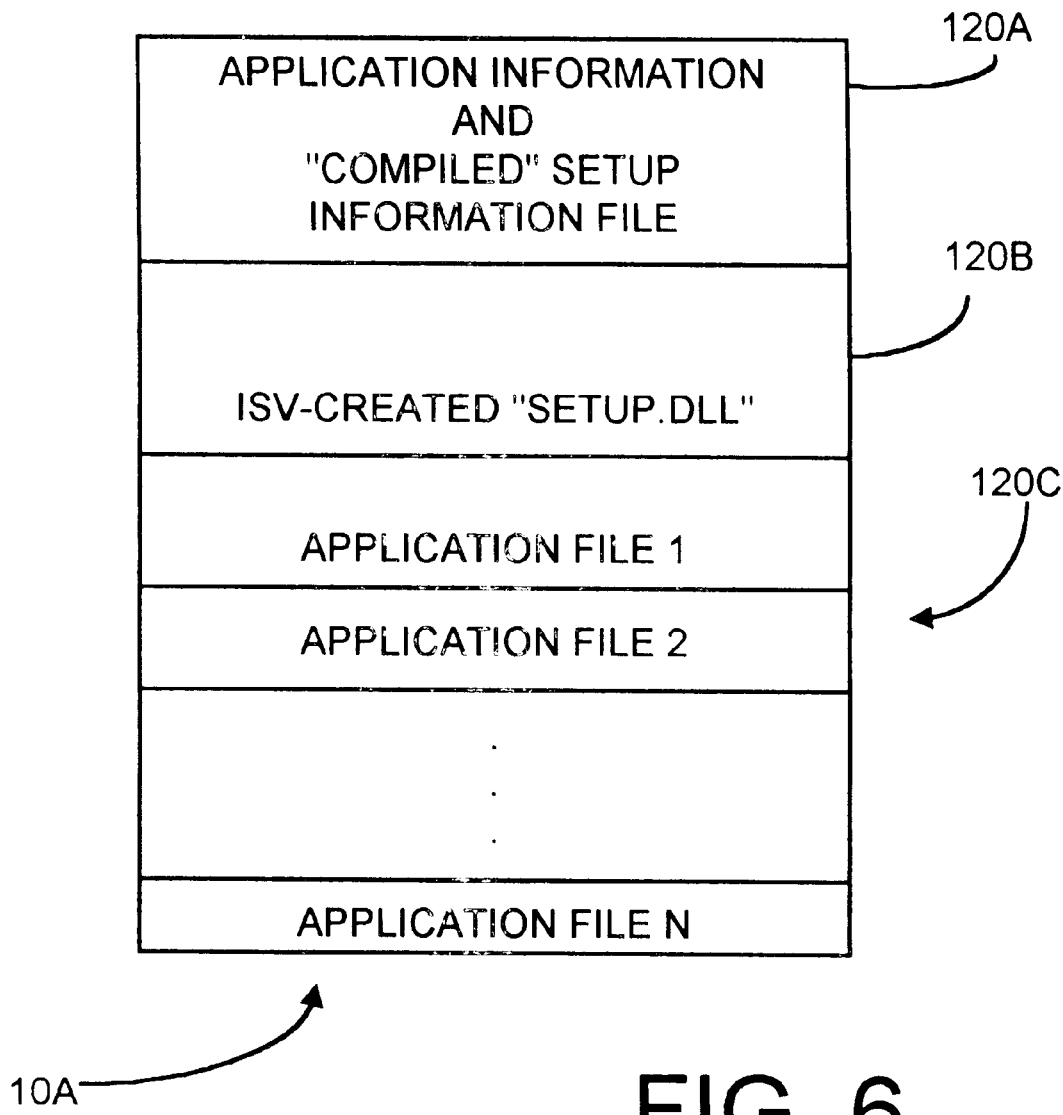
FIG. 6 is a pictorial representation of a file created in accordance with the pictorial of FIG. 5.

FIG. 6 pictorially illustrates a preferred structure of the setup package file 10A. The structure of the setup package file 10A is standard with respect to the other setup package files 10A' and 10A", and includes in a first file the "compiled" setup information file 120A. In a second portion, the optional ISV-created "SETUP.DLL" file 105 is provided, while in the remaining portion, all application binary files 104 are provided at the end of the setup package file 10A.

The "compiled" setup information file 120A contains all of the information about the application program to "unpack" the application from the setup package file 10A. In a preferred embodiment, the "compiled" setup information file 120A also contains information necessary to "re-pack" the application back into the structure shown in FIG. 6. This is particularly useful if the setup package file 10A is then to be transferred from one mobile device 3 to another mobile device, or from the mobile device 3 to the desktop computer 4 for storage. Dynamic creation of the setup package file 10A on the mobile device 3 is not ideal, since the mobile device 3 operates with less memory than the desktop computer 4. However, once the mobile device is connected to a desktop computer, an application on the desktop computer would be able to "re-pack" the application back into the structure shown in FIG. 6, using the "compiled" setup information file 120A to determine all the components (the application files and settings) currently on the mobile device which belong to the current application. Thus, the setup package file 10A is stored in the mobile device memory 90, for possible later "re-packaging". In a preferred embodiment, the "compiled" setup information file 120A is a hidden/read-only file which would remain in the memory 90 of the mobile device 3 as long as the corresponding application is present on the mobile device 3. If the corresponding application is deleted, this file can be then removed.

Generally, the ISV-created SETUP.DLL file 105 provides flexibility to the ISV to customize the application installation process. The ISV-created SETUP.DLL file 105 exports an "init" and an "exit" function, which will be called by the installer module 99 in the mobile device 3 before and after installing the setup package file 10A. In one embodiment, the "init" function can perform any of the following procedures, including displaying an end user license agreement (EULA) and/or splash screen, verifying that a "main" component of the application program is already installed on the mobile device 3 before continuing, or performing any necessary operations in the case of upgrading the application program. For instance, the installer module 99 can determine whether the application program should be installed, before actually installing it on the mobile device 3. As an example, the main component of an application program illustrating various maps in the U.S. would include a map viewer, while other sub-components would include various U.S. maps. In one embodiment, the main component can be stored as a first setup package file, while other sub-components such as various cities in the United States can be stored as other setup package files. For instance, if a user installs the map viewer first from an associated setup package file and then installs a particular setup package file corresponding to a city such as "Seattle", the "init" function in the setup package file corresponding to the city, Seattle, in its associated SETUP.DLL determines whether or not the map viewer has already been installed. If the map viewer has already been installed, unpacking of the setup package file for the city, Seattle, would then occur. However, if the user first attempts to install the setup package file for the city, Seattle, without first installing the map viewer, the "init" function determines that the map viewer is not installed and displays an error message, possibly providing information on where the user can obtain the map viewer. The "init" function returns an error message to the installer module 99 in the mobile device 3 which then cleans up and exits. Thus, the installer module 99 did not need to unpack the setup package file for the city, Seattle, before finding out that the map viewer was not installed In one embodiment, the "exit" function would display an informational message to the user, providing them with a URL to a website that contains more U.S. maps that the user can install on the mobile device 3. It may also automatically launch a tutorial program that teaches the user how to use the map viewer.

In another embodiment, the SETUP.DLL 105 can include the following set of functions Install_init( )—EULA display and version checking;

Install_exit( )—error handling, restoring user data, from the desktop computer 4 to the mobile device 3 and repopulating a user database from the desktop computer 4 to the mobile device 3;

Uninstall_init( ), saving user data from the mobile device 3 to the desktop computer 4, saving user database data from the mobile device 3 to the desktop computer 4 and deleting user database data from the mobile device 3; and Uninstalled_exit( )—final clean up and providing instructions for re-installing the application program.

By providing "init" and "exit" functions during uninstall, the ISV can save user data pertaining to an application program in a file that will be retained by the application manager module 12 (FIG. 1). These functions also allow the ISV to save user database data from the mobile device 3 before deletion.

Figure 7:
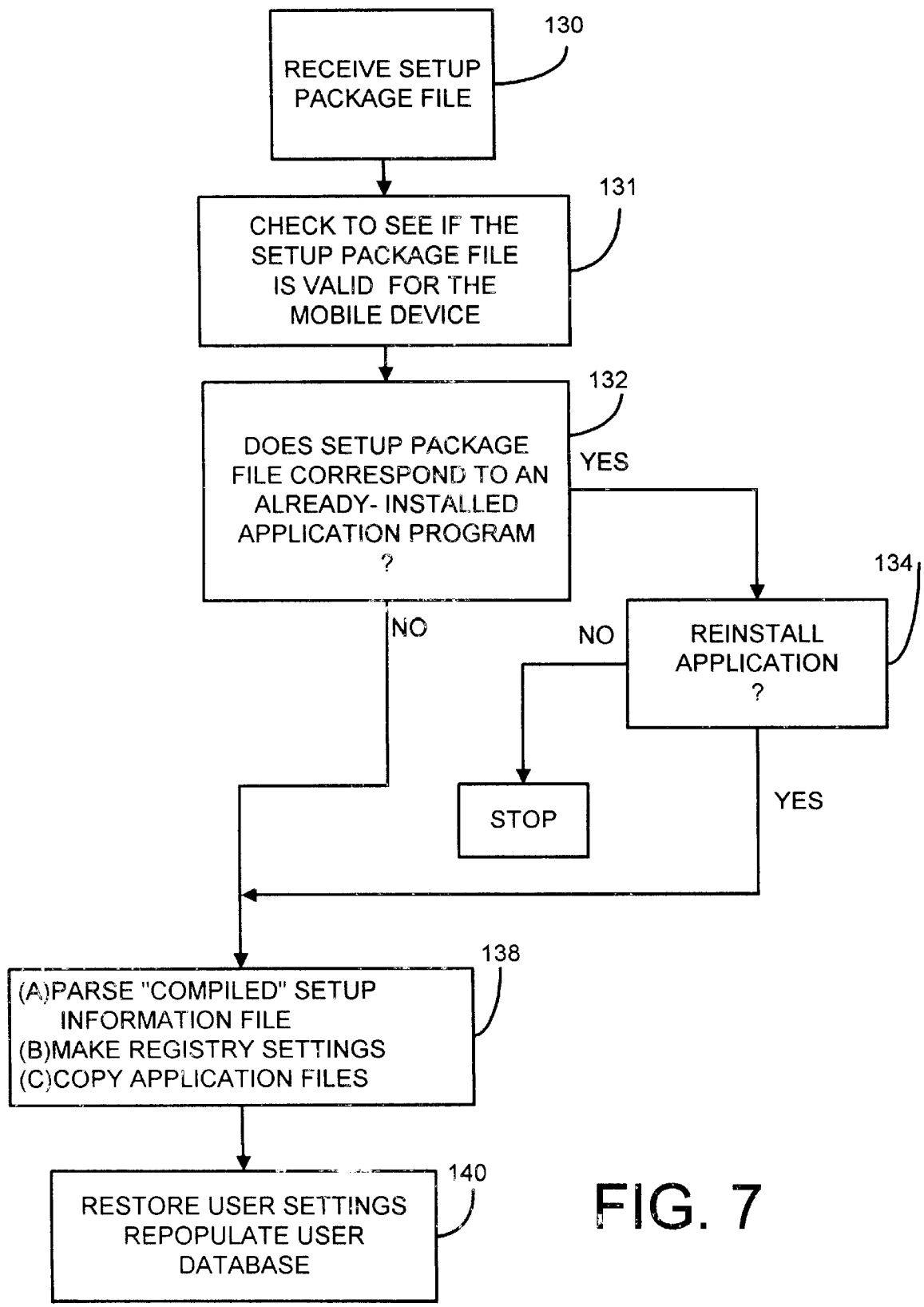
FIG. 7 is a flow diagram illustrating operation of an installer module on the mobile device.

FIG. 7 illustrates, in a flow diagram, transferring and unpacking a received setup package file by the installer module 99 on the mobile device. At step 130, the mobile device 3 receives the setup package file corresponding to the application program to be installed. The setup package file is installed or stored in memory 90. It should be noted that after the setup package file has been received into the mobile device 3, for example, from the desktop computer 4 using the connection mechanism 9, it is possible to break the connection 9 since all of the steps subsequent to step 130 can be performed without further interaction with the desktop computer 4. This minimizes connection time and allows the user to travel away from the desktop computer 4 or another source of the setup package file, while the mobile device 3 begins to unpack the setup package file. Of course, other applications may require extensive user data before the application is fully functional, which may require additional connection time.

At step 131, if desired, the installer module 99 can then determine if the application contained in the setup package file can be run on the mobile device 3. This information is contained in the setup package file in the "compiled" setup information file 120A. If necessary, the installer module 99 can provide an indication to the user that the setup package file contains files that were compiled for a mobile device 3 different than the current one and let the user continue or cancel the installation.

At step 132, if desired, the installer module 99 can then detect if the setup package file pertains to an application program that is already installed on the mobile device 3. If the setup package file does correspond to an application program already installed, the installer module 99 can query the user at step 134 whether to continue the installation (to "reinstall" the application) or not. Reinstalling the application will still retain all user data files, and the ISV can determine whether they will retain the current user settings, or replace them with the default settings, through information in the setup information script file 110.

At step 138, the installer module 99 will parse the "compiled" syntax-error-free setup information file 120A in the setup package file and perform necessary registry settings, create necessary directories and copy the application files 104 (FIG. 6) to each required directory. In a preferred embodiment, the structure of the setup package file illustrated in FIG. 6 has the application program binary files 104 stored in reverse order of how the installer module 99 will "unpack" the application program binary files 104. This allows files to be "unpacked" from back-to-front, truncating the setup package file 10A (relocating the end-of-file marker) after each successful file copy. In this manner, unpacking the setup package file 10A which results in "installing" the corresponding application program can occur with minimal memory space. Although this, in effect, erases the setup package file 10A during installation of the application program, if it is desired to recreate the erased setup package file 10A for transfer to another mobile device or other storage medium, the installer module 99 can retain and use the "compiled" setup information file 120A as discussed above. Allowing the setup package file 10A to be "dynamically truncated" during installation is a powerful feature for a mobile device 3 which has a minimal amount of memory 90. Furthermore, by "dynamically truncating" the setup package file 10A, and the fact that the preferred embodiment of the setup package file 10A is not compressed, the end-user can be assured that the final application program will be installed successfully on the mobile device 3 given the current amount of memory 90, since the resulting application program binary files 104 take the same amount of memory 90 as it did when it was "packed" in the setup package file 10A. No further storage memory 90 is needed to accommodate the resulting application program binary files 104 after unpacking. For users who want to retain the setup package file 10A on the mobile device 3 after installing the application on the mobile device 3, the installer module 99 can include a suitable user interface to query the user and disable the "dynamic truncating" of the setup package file 10A. In this manner, the mobile device 3 retains the setup package file 10A so that the user can later transfer the setup package file 10A in its entirety to another mobile device 3 or the desktop computer 4.

It should be noted that although described herein where a single setup package file includes all the information necessary to install the application on the mobile device 3, another aspect of the present invention is installing the application on the mobile device 3 based on the information stored thereon and, preferably, not significantly increasing memory usage during installation. Therefore, the information stored on the mobile device 3 needed for installation of the application can also be temporarily stored as a plurality of files, at least some of which are automatically deleted or truncated during the installation process. Thus, when the mobile device 3 has enough available space to receive the information for installation of an application, the user is sure there is also enough available space to install the application.

At step 140, the installer module 99 restores any previously retained user settings and repopulates any user database. Although illustrated as the last step, it should be understood that this data can be transferred to the mobile device 3 and stored in memory 90 immediately following the transfer thereof, so as to allow the user to disconnect the mobile device 3 from the desktop computer 4 and then minimize communication time.

Referring back to FIG. 1, the application manager module 12, in a preferred embodiment; performs two functions including adding/removing applications on the mobile device 3 from the desktop computer 4, and retaining user settings and user files and databases for each of the application programs, such as application programs 5A–5C. To perform these functions, the application manager module 12 needs specific information about the installed application program or the application to be installed on the mobile device 3. Generally, the application manager module 12 requires the name of the application program, if the application program is currently installed (or has been removed), what registry values in the mobile device 3 that need to be retained as well as what user data files or user databases in the mobile device 3 that need to be retained. In one embodiment, the installer module 99 creates "home" keys on the mobile device 3 for the application, for example, "HKEY_LOCAL_MACHINE/Software/Apps/<app_name>" and "HKEY_CURRENT_USER/Software/Apps/<app_name>". The installer module 99 will also write registry values that will be provided to the application manager module 12. In a preferred embodiment, all of the registry keys/values under this "home" key will not be recorded in an "uninstall" file used by the application manager module 12 to remove applications, so that the application program can write to these registry keys, and be guaranteed that they will live longer, than the application program on the mobile device 3. In this embodiment, the application manager module 12 is responsible for deleting the "home" key after it detects that the application program is no longer installed on the mobile device 3, and saves the registry data to the desktop computer 4. As discussed above, the next time the application program is installed on the mobile device 3, the application manager module 12 will replace the default registry values present in the setup package file with previously-saved values retained on the desktop computer 4.

In a preferred embodiment, the application manager module 12 maintains a list (or is able to dynamically generate a list) of all setup package files 10A–10D stored on store 8. Preferably, each of the setup package files 10A–10D are "registered" with the application manager module 12. A typical registration of the setup package file on the store 8 includes copying the setup package files (such as setup package files 10A, 10A' and 10A") from any one of the removable storable devices indicated in FIG. 2 such as from a CD-ROM using the optical drive 31. By launching the application manager module 12 and providing information such as the location of the setup package files, the application program is registered with the application manager module 12. At this point, the application manager module 12 will read and interpret the "compiled" setup information file 120A for each of the setup package files 10A, 10A' and 10A", and retain the CPU information of each of the setup package files in persistent data (such as the Registry of the desktop computer 4). This allows the application manager module 12 to determine which single setup package file matches the specific CPU type of a mobile device 3 from the set of setup package files 10A, 10A' and 10A".

In one embodiment, registration of application with the application manager module includes the use of an initialization file, commonly known as a "INI" file in Windows brand operating systems. The initialization file stores application specific information such as registry keys for uninstalling or removing the application files, the directory where the setup package files are to be stored, information for displaying icons associated with the application, and the name of each setup package file 10A, 10A' and 10A". The ISV creates the initialization file and provides it to the application manager module 12. An example of an initialization file for a game application is provided below and follows the well-known format for Windows brand operating systems:

[CEAppManager]
  Version=1.0
  Component=Games

[Games]
  Description=Game Pack for Windows CE brand device
  Uninstall=Game Pack (the uninstall registry key)
  InstallDir=C:\Program Files\CE Game Pack (where to store setup package files 10A–10A")
  IconFile=gamepack.ico (relative path from InstallDir)
  IconIndex=0
  DeviceFile=gamepack.exe (program to display icon)
  CabFiles=CPU1\gamepack.cab, CPU2\gamepack.cab (relative to InstallDir)

In one embodiment, the user executes the setup program on the desktop 4 and the setup program copies the initialization file and the setup package files 10A, 10A' and 10A" to the store 8. Preferably, the application manager module 12 is also stored in the store 8 wherein the location is stored in the registry of the desktop 4. The setup program accesses the registry and obtains the location of the application manager module 12. The setup program then launches the application manager module 12 with the full pathname to the initialization file. The application is then registered with the application manager module since the initialization file provides the location of the corresponding setup package files 10A, 10A' and 10A".

Figure 8:
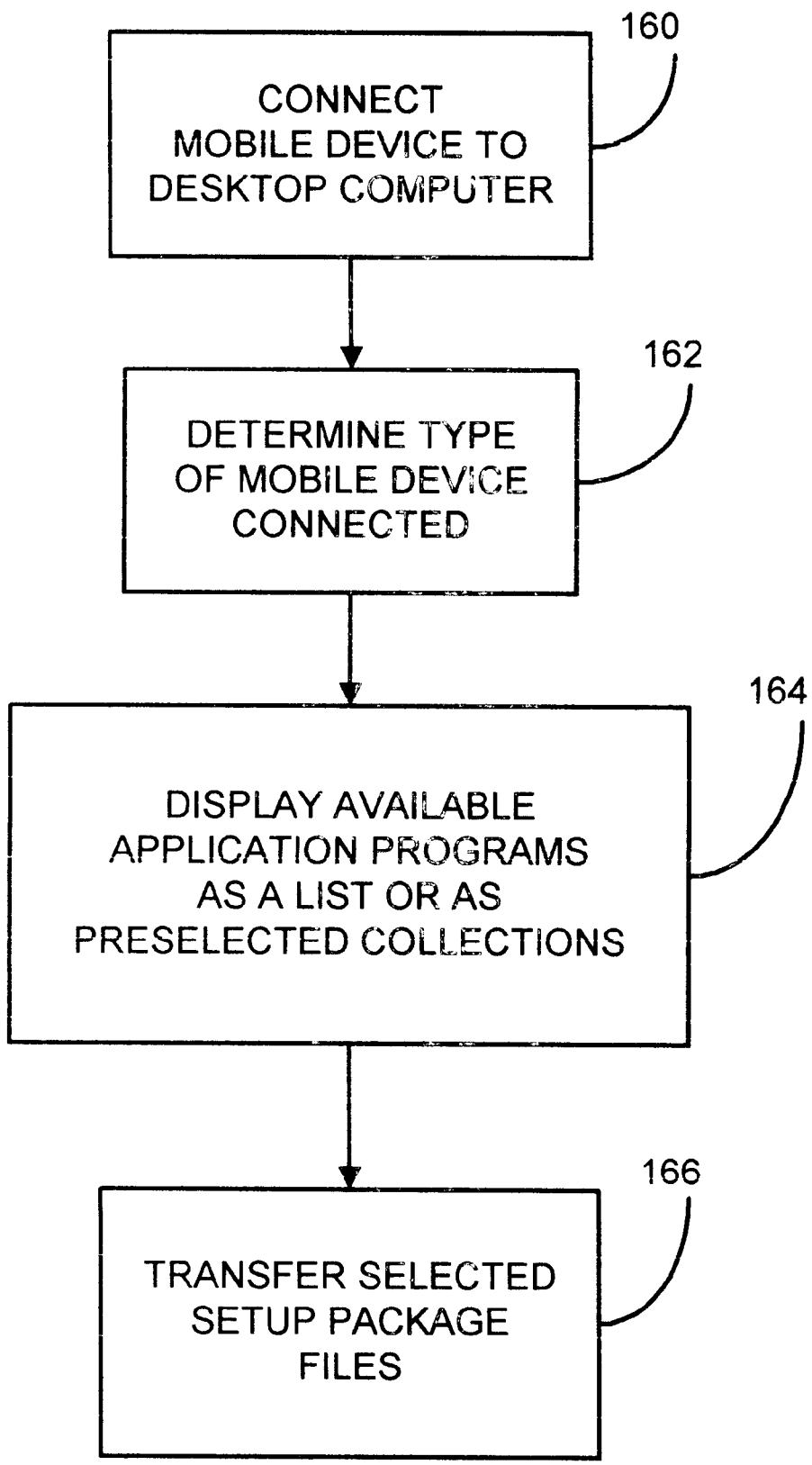
FIG. 8 is a flow diagram illustrating operation of an application manager module.

FIG. 8 generally illustrates operation of the application manager module 12. At step 160, the mobile device 3 is connected to the desktop computer 4 through the connection mechanism 9. The user then launches the application manager module 12 on the desktop computer 4, which preferably determines the specific type of the mobile device 3 and, in particular, what type of CPU is present on the mobile device 3. The detection is performed by the application manager module 12 using exposed mobile device 3 APIs and methods. Information provided by these procedures is compared with information stored in the persistent data by the application manager module 12 on the desktop computer 4 (such as the Registry) during the registration procedure in order to determine which setup package file to use, given the set of setup package files 10A, 10A' and 10A" currently residing on the desktop computer 4 in store 8.

Figure 9:
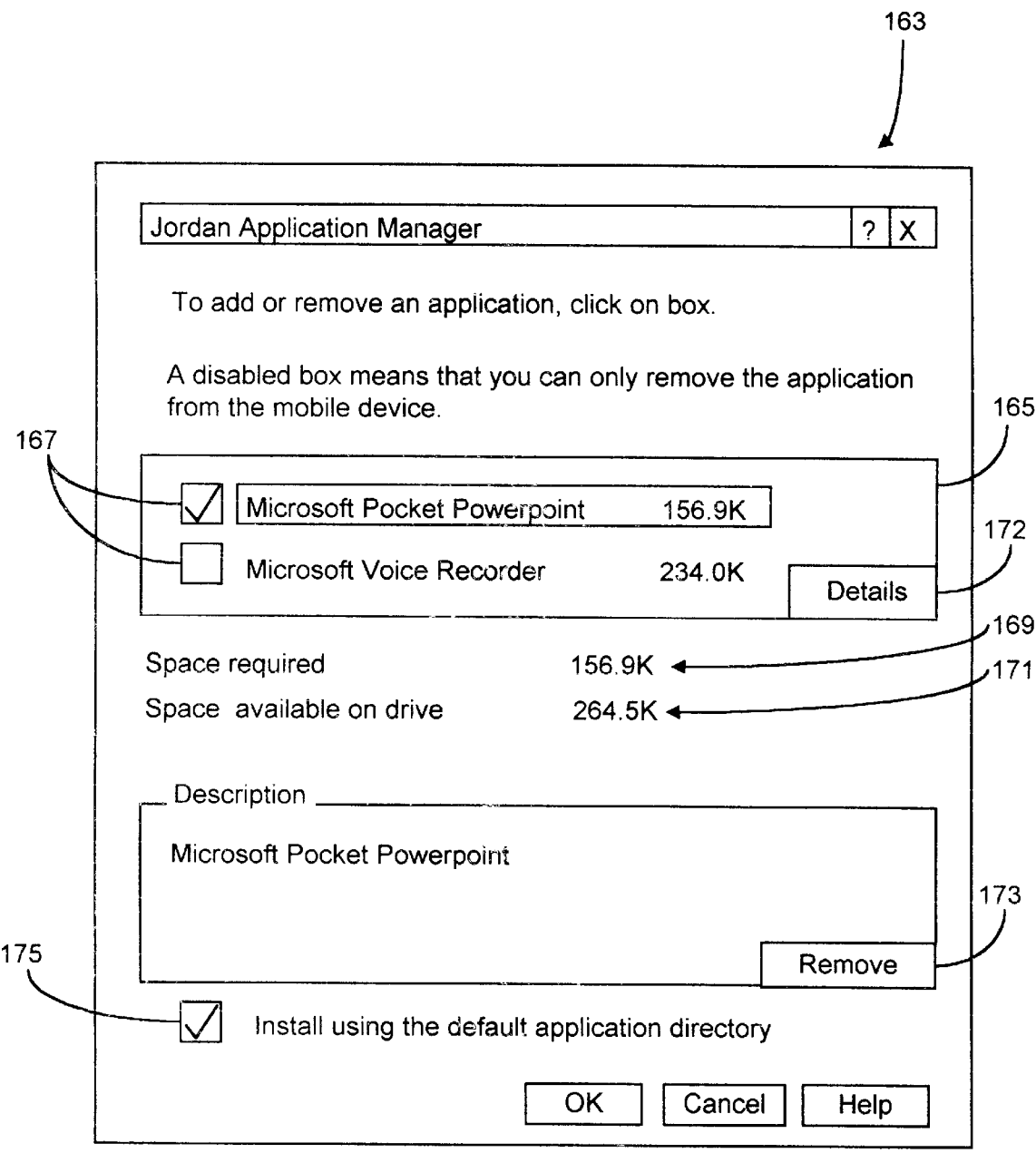
FIGS. 9 and 10 illustrate user interfaces displayed by the application manager module.

At step 164 in FIG. 8, the application manager module 12 displays a user interface such as illustrated in FIG. 9 at 163. The user interface 163 includes a list 165 of available application programs stored as application setup package files in the store 8 with suitable identifiers 167 that can be selected by the user to indicate to add or remove each application from the mobile device 3. In the embodiment illustrated, the user can install or uninstall the application by checking or unchecking the associated identifier 167 for each application.

Step 166 represents transfer of the selected setup package files and includes removing or uninstalling applications from the mobile device 3. Preferably, application programs are uninstalled from the mobile device 3 prior to installing or transferring newly selected application programs. This allows memory 90 to be made available and user settings to be retained prior to the new installation of the selected application program. Using the "uninstall" file, which can be created dynamically during installation of the application program and stored on the mobile device 3, the application manager module 12 parses the "uninstall" file to remove or delete the necessary files from the mobile device 3. The values under the "home" registry keys, and the user data file are not deleted, since they were not recorded in the "uninstall" file. The application module manager 12 then copies the data in the "home" registry keys from the mobile device 3 to the desktop computer 4 and copies the user data file accordingly. It then deletes the "home" registry keys and the user data file on the mobile device 3.

In the event that the user removed the application program from the mobile device 3 while the mobile device 3 was disconnected from the desktop computer 4, the application manager module 12 can be still be used to save the user settings and the user data. Specifically, when the user connects the mobile device 3 to the desktop computer 4, the application manager module 12 determines that there was an application program installed by the desktop computer 4 that is not currently on the mobile device 3. Accordingly, the application manager module 12 determines that there is user data remaining on the mobile device 3. The application manager module 12 then copies the data in the "home" registry keys from the mobile device 3 to the desktop computer 4 and copies the user data files. Accordingly, the application manager module 12 then deletes the "home" registry keys and the user data file on the mobile device 3. If, at a later time, the user wants to reinstall the application to the mobile device 3 again, the application manager module 12 can be relaunched to copy the setup package file to the mobile device 3 and run the installer module 99 in the mobile device 3. Once the installer module 99 finishes installing the application, the application manager module 12 can overwrite the default registry values in the "home" registry keys and the previously saved values as well as overwrite the default user data file with the previously saved data file. Accordingly, when the user runs the application program on the mobile device 3, it appears as if the application program was never removed from the mobile device 3 since all of the user settings have been maintained by the desktop computer 4 and reinstalled.

In a further preferred embodiment, the application manager module 12 identifies and displays those applications on or installable on the mobile device 3 that do not have corresponding applications on the desktop computer 4. For example, such applications can be shaded in the list 165 to distinguish them from applications on or installable on the mobile device 3 that do have corresponding applications on the desktop computer 4. In this manner, the user can uninstall any application from the mobile device 3, in one embodiment, saving at least the user data on the desktop computer 4 before it is deleted on the mobile device 3. If the mobile device 3 or desktop computer 4 includes a suitable module to recreate the setup package file as discussed above, the user can also store the associated setup package file, if desired automatically, on the desktop computer 4 for later installation back on the mobile device 3. This allows the user to save the setup package file on the desktop computer 4 even though the setup package file may have originally been transferred to the mobile device 3 using another method, such as from the removable memory card 3A or the Internet 4A (FIG. 1).

In one embodiment, the application manager module 12 filters all available applications and displays the list 165 that shows only those application programs having setup package files specifically directed to and installable on the mobile device 3. The user then selects which application program or programs to install on the mobile device 3 from the displayed list 165 of identifiers 167. If the user would like to remove the application from the mobile device 3 and the desktop computer 4, display button 173 can be actuated. A display button 175 is also provided to indicate that when an application is to be installed on the mobile device 3, a default directory and settings are to be used. If the display button 175 is unchecked, the application manager module 12 will prompt the user for the installation directory for each application to be installed on the mobile device. In the embodiment illustrated, the user interface 163 also displays the space required for installing selected applications at 169, and the available space on the mobile device 3 at 171. Before installation, the application manager module 12 can check the available space on the mobile device 3 to make sure there is enough space for installation (taking into account what will be removed) and provide an error message if not enough space is available.

It should also be noted that an application identified by an identifier 167 can also have multiple components. For example, a "GAMES" application can have a plurality of games that can be individually selected such as solitaire, blackjack, etc. Another example of an application having multiple components is the map view discussed above, wherein maps for various cites can be stored in separate setup package files. Activation of display button 172 allows the individual components to be displayed and selected.

In the mode of operation illustrated in FIG. 8, the application to be installed on the mobile device 3 is selected while the mobile device 3 is connected to the desktop computer 4. It should be understood that in a second mode of operation, the application manager module 12 can also be run without the mobile device 3A connected to the desktop computer 4. For instance, if desired, a user may desire to preselect which applications to uninstall and install when the mobile device 3 is next connected to the desktop computer 4. This mode of operation can be particularly advantageous when it is necessary that a plurality of mobile devices be configured to have the same applications although the mobile devices may be connected to the desktop computer 4 at different times. By preselecting and storing information as to which applications to uninstall and install, a manager of a plurality of mobile devices can be assured that once connected, each mobile device will be configured the same. In a further embodiment, the application programs can be grouped in preformed collections wherein selection of an identifier for any one of the collections allows a plurality of application programs to be sequentially transferred to the mobile device 3. For instance, a first collection can include work related application programs such as applications directed to spread sheets, a contact manager and a task organizer. A second collection of application programs can be directed to home or personal use and can include, for example, a personal money manager and game programs. A third collection of application programs can include travel-oriented applications such as a travel planner and a map viewer.

Figure 10:
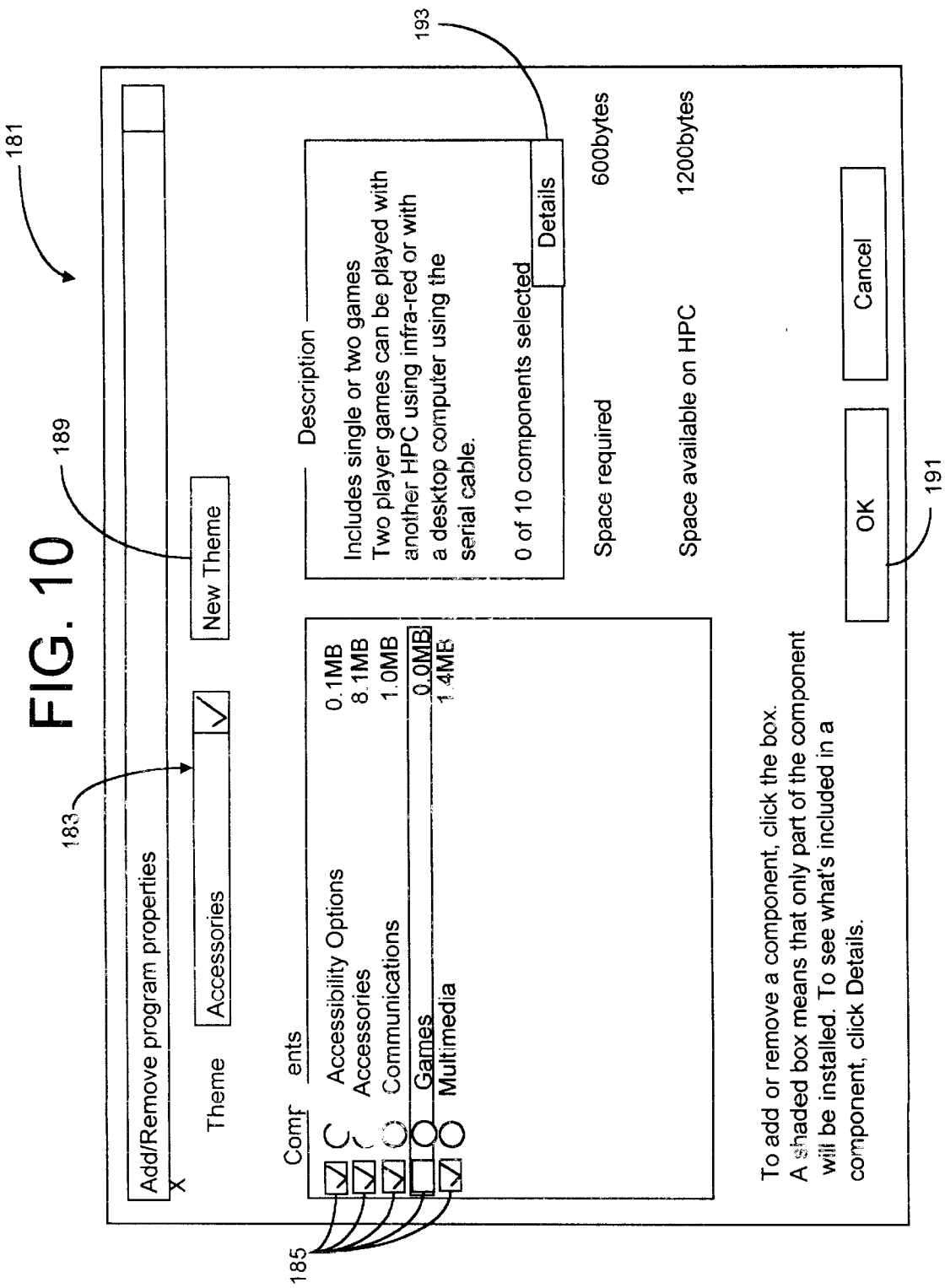

FIG. 10 illustrates a user interface 181 for managing a collection herein denoted as a "Theme". Field 183 allows selection of a collection via a pulldown menu that provides a list of all collections. Field 185 lists all the applications available for the mobile device 3 and identifiers 185 are used to add or remove the application from the collection. In the embodiment illustrated, a check in the identifier 185 indicates that the application is part of the collection; no check in the identifier 185 indicates that the application is not part of the collection; and a checked and shaded identifier 185 indicates that only a component of the application will be installed. A display button 193 can be actuated to display the components of the application as described above. A new collection can -be formed by activating display button 189. The collection can be installed by activating display button 191.

In yet another embodiment, each collection can be for a particular user, wherein the application programs are the same. For instance, a sales force of five users can use separate mobile devices wherein each of the users has specific or unique user data settings and user data files and databases on the desktop computer 4 for use with each mobile device. Upon selection of the corresponding collection, the application programs are installed onto each mobile device using the setup package files and the user's specific settings and user data files and databases stored on the desktop computer 4.

Each of the selected application programs either from. the list or from preformed collections is transferred to the mobile device 3 at step 166 in FIG. 8. Upon transfer of the corresponding setup package files, the installer module 99 in the mobile device 3 unpacks the corresponding setup package files as described above.

Although the present invention has been described with reference to preferred embodiments, workers skilled in the art will recognize that changes may be made in form and detail. without departing from the spirit and scope of the invention.

What is claimed is:

1. A method of installing applications for a plurality of mobile devices from a storage source, wherein each mobile device is of a different type, the method comprising:

storing on the storage source a plurality of applications, each application being designed to be executed on a unique type of mobile device when the mobile device is disconnected from the storage source;

connecting the mobile device to the storage source;

detecting the type of mobile device connected;

displaying an identifier for each application designed for the detected mobile device; and transferring an application designed to be executed on the mobile device from the plurality of applications to the mobile device as a function of the type of mobile device detected.

2. The method of claim 1 wherein the step of displaying includes displaying an identifier for each of a plurality of collections of preformed applications applicable to the detected mobile device.

3. The method of claim 1 wherein each stored application comprises a setup package file comprising a single file having a first portion comprising application specific information and a second portion comprising application files, wherein the application specific information includes setup information.

4. A method of installing program applications from a storage source onto a mobile device, the method comprising:

storing on the storage source a setup package file comprising a single file having a first portion comprising application specific information and a second portion comprising application files, wherein the application specific information includes setup information;

transferring and storing the setup package file on the mobile device; and unpacking the setup package file stored on the mobile device to create an executable application program on the mobile device, wherein the step of unpacking includes dynamically truncating the setup package file by relocating an end-of-file marker of the setup package file during unpacking.

5. The method of claim 4 wherein the setup information includes at least one of settings to be made on the mobile device and where the application files are to be stored on the mobile device.

6. The method of claim 4 and further comprising:

connecting the mobile device to the storage source; and detecting the type of the mobile device from a plurality of known mobile devices.

7. The method of claim 6 and further comprising:

displaying identifiers indicative of setup package files applicable to the detected mobile device.

8. The method of claim 7 wherein the step of displaying includes displaying an identifier for each of a plurality of collections of preformed setup package files applicable to the detected mobile device.

9. The method of claim 4 wherein during the step of unpacking memory usage on the mobile device does not increase.

10. The method of claim 4 wherein the storage source is a desktop computer.

11. The method of claim 4 wherein the storage source is a second mobile device.

12. The method of claim 4 wherein the storage source is part of a wide area network.

13. The method of claim 4 wherein the storage source is a storage card.

14. The method of claim 4 and further comprising retaining the setup information file in memory on the mobile device after the step of unpacking.

15. The method of claim 14 and further comprising recreating the setup package file on the mobile device using the setup information file.

16. The method of claim 15 wherein the step of recreating includes recreating the setup package file on the storage source.

17. The method of claim 15 wherein the step of recreating includes automatically recreating the setup package file on the storage source if possible from the mobile device.

18. The method of claim 19 wherein the step of recreating includes obtaining application program files on the mobile device and obtaining registry settings on the mobile device.

19. The method of claim 4 wherein the step of recreating includes recreating the setup package file on the mobile device.

20. A method of installing program applications from a storage source onto a mobile device, the method comprising:

storing on the storage source a plurality of setup package files, wherein each setup package file comprises a single file having a first portion comprising application specific information and a second portion comprising application files, wherein the application specific information includes setup information;

connecting a mobile device to the storage source;

detecting the type of the mobile device; and displaying an identifier for each of a collection of setup package files applicable to the detected mobile device.

21. The method of claim 20 wherein the setup information includes at least one of settings to be made on the mobile device and where the application files are to be stored on the mobile device.

22. A method of installing a program application on a mobile device, the method comprising:

storing information on the mobile device indicative of the application to be installed; and deleting the information on the mobile device as the application is being installed on the mobile device, wherein the step of deleting includes dynamically truncating by relocating an end-of-file marker of the information during deleting.

23. The method of claim 25 wherein the step of storing includes storing the information in memory, and wherein during the step of deleting memory usage on the mobile device does not increase.

* * * * *